(12) United States Patent  
Bao et al.

(10) Patent No.: US 7,499,151 B2
(45) Date of Patent: Mar. 3, 2009

(54) DISTRIBUTED BRILLOUIN SENSOR SYSTEM BASED ON DFB LASERS USING OFFSET LOCKING

(75) Inventors: Xiaoyi Bao, Ottawa (CA); Evgueni Ponomarev, Ottawa (CA); Yun Li, Ottawa (CA); Fabien Ravet, Ottawa (CA); Lufan Zou, Ottawa (CA); Omur M. Sezerman, Kanata (CA)

(73) Assignee: University of Ottawa, Ottawa (CA)

( * ) Notice: Subject to any disclaimer, the term of this patent is extended or adjusted under 35 U.S.C. 154(b) by 0 days.

(21) Appl. No.: 11/806,986

(22) Filed: Jun. 5, 2007

(65) Prior Publication Data

US 2008/0018903 A1    Jan. 24, 2008

Related U.S. Application Data

(60) Provisional application No. 60/810,697, filed on Jun. 5, 2006.

(51) Int. Cl.
*G01L 1/24* (2006.01)
(52) U.S. Cl. ..................... 356/35.5; 356/477
(58) Field of Classification Search ................ 356/477, 356/35.5, 73.1
See application file for complete search history.

(56) References Cited

U.S. PATENT DOCUMENTS

| | | | | |
|---|---|---|---|---|
| 5,657,307 A | * | 8/1997 | Taneya et al. | 369/116 |
| 5,751,413 A | * | 5/1998 | Chung et al. | 356/73.1 |
| 7,190,868 B2 | * | 3/2007 | Yamamoto et al. | 385/123 |

* cited by examiner

*Primary Examiner*—Tarifur Chowdhury
*Assistant Examiner*—Michael LaPage

(74) *Attorney, Agent, or Firm*—Jones, Tullar & Cooper, P.C.

(57) ABSTRACT

A distributed Brillouin sensor system is provided. The system has two distributed feedback (DFB) lasers, which are locked at the Brillouin frequency of the optical fiber through offset locking method by coupler splitting into two parts. The split parts are sent to two photodiodes, the outputs of which are sent to a mixer. A PID controller means follows the mixer and a current controller follows the PID controller. The lasers have a wavelength of 1550 nm. The PID controller locks the frequency difference. An optical delay line is used to produce the frequency tuning of the two DFB lasers around the Brillouin frequency of the optical fibers. The lock-in amplifier is used to keep the DC level of the optical modulator at minimum.

18 Claims, 2 Drawing Sheets

DISTRIBUTED BRILLOUIN SENSOR SYSTEM BASED ON DFB LASERS USING OFFSET LOCKING

CROSS REFERENCE TO RELATED APPLICATIONS

This application claims the benefit, under 35 U.S.C. 119 (e), of U.S. Provisional Application No. 60/810,697, filed Jun. 5, 2006, which is hereby incorporated by reference in its entirety.

TECHNICAL FIELD

The present device relates to a distributed Brillouin sensor system based on two DFB lasers offset locked at the Brillouin frequency with optical delay line to provide frequency tuning, which is useful in monitoring the health of large structures with long or large surface areas.

BACKGROUND

Structural Health Monitoring (SHM) is used to identify early signs of problems, allowing prevention of disasters and then the repair of these damages. It is also used to provide guidelines for new building materials, reducing the need for repair over the structure's lifetime. Currently, sensors used for SHM are punctual devices that give only partial information about the stresses affecting the structure. Their localized nature gives incomplete information about the structure health. They fail to locate defects in the early stage, such as cracks or buckling, which require centimeter spatial resolution over large structural coverage. There is a need for a technique that detects faults and assesses the severity of the damage of the whole structure. Such a sensor must perform distributed temperature and strain measurements over tens of meters to kilometers.

Fiber optic distributed strain and temperature sensors measure strain and temperature over very long distances and are an excellent tool for monitoring the health of large structures, such as pipelines, power distribution lines, dams, security systems, defense equipment, bridges and for fire detection. These sensors leverage the huge economies of scale in optical telecommunications to provide high resolution long-range monitoring at a cost per kilometer that cannot be matched with any other technology.

A common fiber optic sensor technology appropriate for localized measurements is known as fiber Bragg grating sensors. However, for structural health monitoring, when the potential damage or leakage locations are unknown, it is difficult to pre-determine the places to put fiber Bragg grating sensors or strain gauges. Fiber Bragg grating sensors work well as a localized sensor when the specific area of interest is known.

The most common type of strain and temperature measurement uses a phenomenon known as stimulated Brillouin scattering. The form of this measurement is illustrated in FIG. 3. The typical sensor configuration requires two lasers that are directed in opposite directions through the same loop of fiber (one laser operating continuously, the other pulsed). When the frequency difference between the two lasers is equal to the "Brillouin frequency" of the fiber, there is a strong interaction between the 2 laser beams inside the optical fibers and the enhanced acoustic waves (phonons) generated in the fiber. This interaction causes a strong amplification to the Brillouin signal which can be detected easily and localized using an Optical Time Domain Refelectometry (OTDR)-type sampling apparatus. To make a strain or temperature measurement along the fiber, it is necessary to map out the Brillouin spectrum by scanning the frequency difference (or "beat" frequency) of the two laser sources and fitting the peak of the Brillouin spectrum to get the temperature and strain information.

The following equation defines the relationship shown in FIG. 3:

$$v_{BS} = v_{BO} + C_T(T-T_0) + C_\epsilon(\epsilon-\epsilon_0)$$

As the above equation shows, the Brillouin frequency at each point in the fiber is linearly related to the temperature and the strain applied to the fiber. Where $v_{Bs}$ represents the measured Brillouin frequency and $v_{BO}$ represents the Brillouin frequency at the reference temperature or strain, $C_T$ and $C\epsilon$ are the temperature and strain coefficients.

Brillouin sensors could be used for the detection of corrosion in terms of the strain change on structural surface due to the corrosion of steel induced deformation on the concrete column in large structures. Brillouin fiber optic sensors excel at long distance and large area coverage, such as any application with total lengths in excess of 10 meters. Distributed Brillouin sensors can be used for much broader coverage and can locate fault points not known prior to sensor installation.

Two types of Brillouin fiber optic sensors exist. Brillouin Optical Time Domain Reflectometers (BOTDR) resolve the strain or temperature based Brillouin scattering of a single pulse. Brillouin Optical Time Domain Analysis (BOTDA) uses a more complicated phenomenon known as Stimulated Brillouin Scatter (SBS). For Stokes scattering (including Brillouin scattering and Raman scattering) only a small fraction of light is scattered at optical frequencies different from, and usually lower than, the frequency of the incident photons. Due to the weak Brillouin signal, the measurement range of BOTDR is limited and SNR is generally worse than that found with BOTDA technology.

One advantage of BOTDR technology is that only one end of the fiber needs to be accessible. The BOTDA technique is significantly more powerful, however, as it uses enhanced Brillouin scattering through two counter-propagating beams. Due to the strong signal strength, the strain and temperature measurements are more accurate and the measuring range is usually longer than that of BOTDR technology, except the length is reduced to half due to the double side's access. The BOTDA method requires more optical components and a 2-way optical path so the total system cost is typically higher (the sensor fiber must be looped or mirrored), however, most field units deployed today are BOTDA systems because the additional measurement accuracy more than justifies the moderate increase in system cost. Accordingly, it is preferable to use BOTDA-based sensor systems as such systems offer highly accurate and fast measurement of strain and temperature.

Several examples of systems that use Brillouin sensors can be found in the art. One sample system is discussed in U.S. Pat. No. 6,910,803, which relates to oil field applications. This patent teaches the use of fiber optics to sense temperature only. Brillouin scattering is employed and photodiodes and frequency determination are used.

Another example of a system that uses a Brillouin sensor is U.S. Pat. No. 6,813,403, in which large structures are monitored using Brillouin spectrum analysis. A Brillouin scattering sensor is used with two frequency tunable lasers at 1320 nm for strain, displacement and temperature determination based on typical measurements.

As another example, U.S. Pat. No. 6,555,807 teaches an apparatus for sensing strain in a hydrocarbon well. The apparatus uses a DFB laser split into two signals. A returned Brillouin signal is mixed with a reference signal and sent to an analyzer, where the Brillouin frequency shift can be detected.

The problem with some of the systems known in the art is that these systems cannot tell the difference between externally applied strain and temperature induced strain. In addition, the main problem in developing a Brillouin scattering based sensor system using DFB lasers is the stabilization and tuning of the frequency difference between the lasers.

SUMMARY

The present device relates to a distributed Brillouin sensor system that is based on 1550 nm DFB (Distributed FeedBack) lasers with a PID (Proportional Integral Derivative) controller to lock the frequency difference and to lock the modulator's bias by the lock in amplifier for minimum leakage level of the pulse signal. An optical delay line is used to produce the frequency tuning of two DFB lasers around the Brillouin frequency of the optical fibers. This distributed sensor system based on DFB lasers solves the deficiencies of prior art systems and is capable of generating better than 1 m spatial resolutions.

In one aspect a distributed Brillouin sensor system having optical fiber connections is provided comprising: two distributed feedback (DFB) lasers; means for combining the outputs of the lasers and splitting the combination into first and second signal components; a first photodiode and a second photodiode arranged to receive as an input the first signal component and the second signal component respectively; a mixer for combining the output signals of the two photodiodes; PID controller means following the mixer; and a current controller following the PID controller.

BRIEF DESCRIPTION OF THE DRAWINGS

The following description will be better understood with reference to the drawings in which.

DESCRIPTION OF THE PREFERRED EMBODIMENTS

Figure 1:
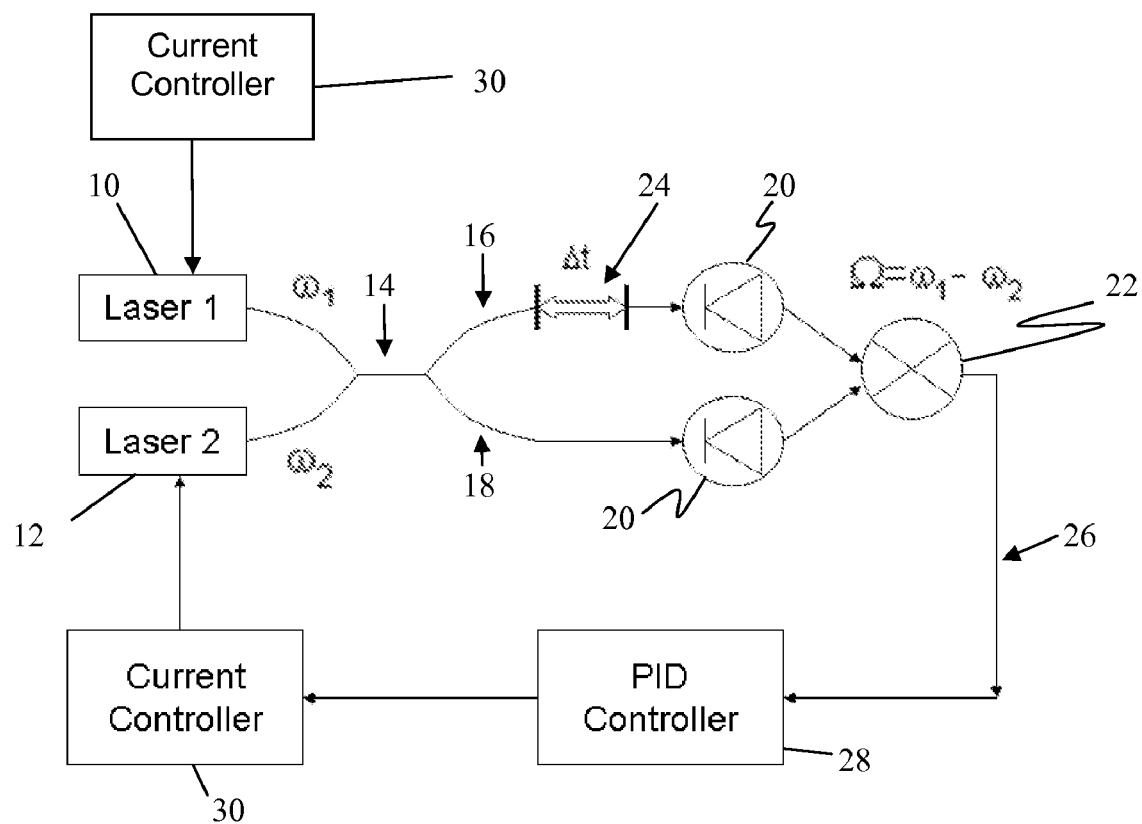
FIG. 1 shows a controller design using a PID controller for locking of two DBF laser frequency offsets at the Brillouin frequency.

In one embodiment, illustrated in FIG. 1, a controller is provided using two DFB lasers 10, 12 that allow for stabilization and tuning of the frequency difference between the lasers. The outputs $\omega_1$ and $\omega_2$ of the two lasers 10, 12 are combined together 14, then the light is split into two parts 16, 18, one of which has a delay line 24 of known length $\Delta t$. The beat signal is measured in each part using two fast photodiodes 20. After the photodiodes 20, the electrical signals are combined in a mixer 22.

The mixer DC output 26 depends periodically on the electrical signal phase difference according to the equation Cos $((\omega_1-\omega_2)\Delta t)$. The beat frequency of the measured electrical signal equals the frequency difference between the two lasers, while the signal phase difference depends on the time delay difference of the two optical paths for the split light. A PID controller 28 is tuned in order to keep the mixer DC output 26 at zero level. At the same time, the temperature of the lasers 10, 12 is stabilized using two independent temperature (current) controllers 30.

With the beat frequency stabilized, Brillouin scattering measurements can be taken in a single mode fiber. This arrangement gives temperature or strain readings along the length of the fiber, with spatial resolution of 1-2 m and allows regions of temperature or strain to be identified while utilizing the same fiber for telecommunications.

The optical delay line 24 provides the tuning of this laser system so that the two DFB lasers are locked at the Brillouin frequency. The PID controller 28 ensures that the beat frequencies of the two DFB lasers 10, 12 are locked at the Brillouin frequency. When the optical delay line 24 is tuned, it allows one of the DFB lasers to be tuned across the Brillouin spectrum.

Using this approach, a standard deviation of the beat frequency of ~50 kHz was achieved. By changing the relative time delay between the two optical paths using a variable time delay line 24, the beat frequency was tuned in the range of ~800 MHz, limited by delay range. The speed of the sensor system is determined by the delay line's scan rate. This distributed fiber optics Brillouin scattering sensor system works at standard telecom wavelengths, in which the fiber loss is the lowest equivalent to the longest sensing length.

Figure 2:
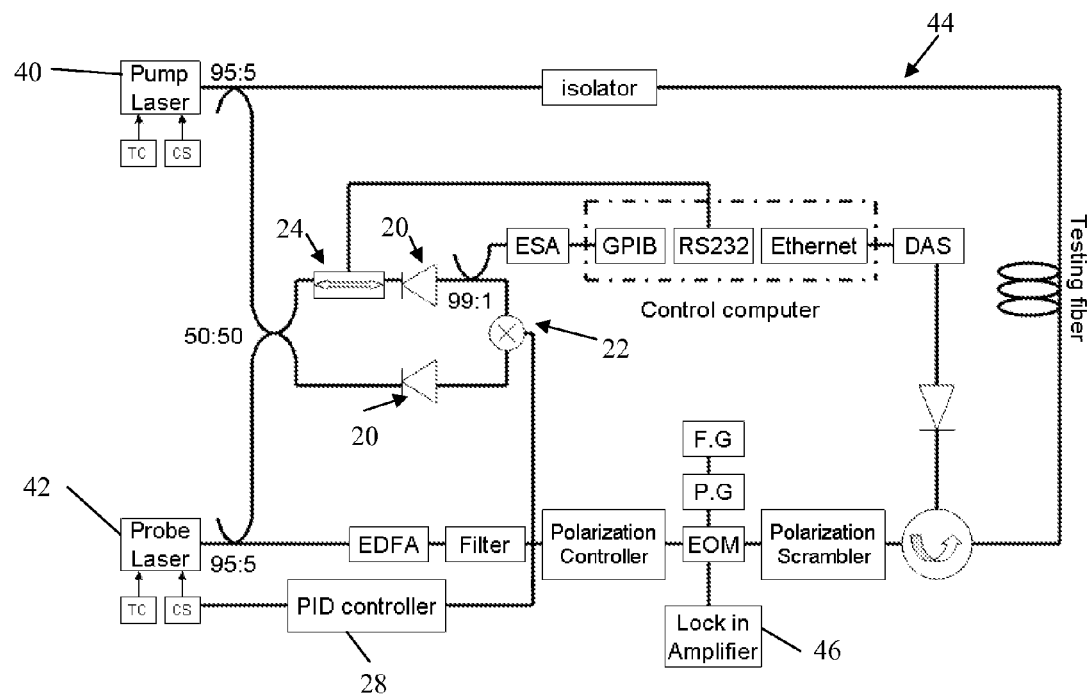
FIG. 2 shows the PID controller locked DFB laser frequency based distributed Brillouin sensor using two 1550 nm lasers.
Figure 3:
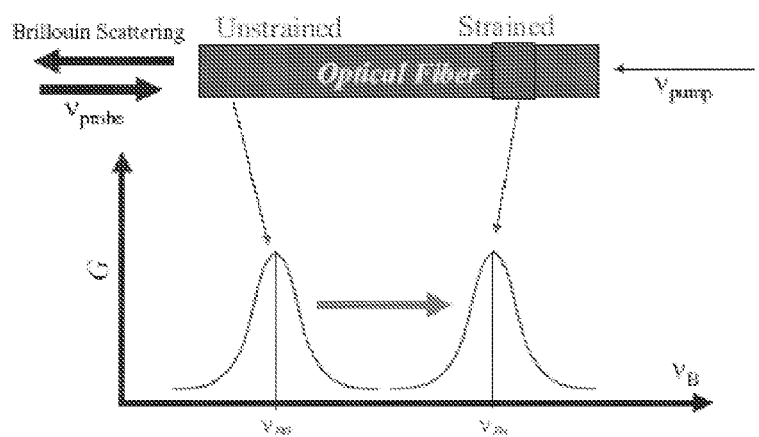
FIG. 3 shows Brillouin spectral peaks from strained and unstrained fibers.

A sensor system using DFB lasers 40, 42 is shown in FIG. 2. The optical fiber connection 44 is a PM (Polarization Maintaining) fiber to reduce the polarization state variation induced by the Brillouin gain fluctuation.

The lock-in amplifier 46 shown in FIG. 2 compensates for the bias drift in the optical modulator and ensures the minimum DC level for the pulse generation; so that a stable power output can be obtained along with highest extinction ratio for a higher strain and temperature measurement accuracy. The system shown in FIG. 2 also has the following components:

ESA: electronic spectrum analyzer
    DAS: data acquisition system
    F.G: function generator
    P.G: pulse generator
    EOM: electro-optic modulator
    GPIB: General Purpose Interface Bus
    RS232: Recommended Standard 232 (computer serial interface, IEEE; usually written RS-232)
    EDFA: Erbium Doped Fiber Amplifier In the system shown in FIG. 2, the DFB laser 40 works as the pump laser. A current source (CS) and a temperature controller (TC) act as a current controller (like the current controller 30 of the FIG. 1 embodiment) to stabilize the temperature of the DFB laser 40. The output light from DFB laser 40 is split by a fiber coupler. Five percent of the output light is sent to the offset locking sub-system, which includes the optical variable time delay line 24, the photodiode 20 (or photo-detector), the mixer 22, and the PID controller 28. 95% of the output light passes through an isolator, and then goes to the testing fiber.

DFB laser 42 works as probe laser in the distributed sensor system of FIG. 2. A current source (CS) and a temperature controller (TC) also act as current controller as in the DFB laser 40. The output from DFB laser 42 is split by a fiber coupler and five percent of the output light is sent to the offset locking sub-system. The remaining 95% of the output light is first amplified by an EDFA (Erbium Doped Fiber Amplifier), and then filtered by an optical filter. A polarization controller is used to adjust the polarization state of the output light from the optical filter. After the polarization controller, an EOM (Electrical Optical Modulator) generates an optical pulse. The lock-in amplifier 46 stabilizes the bias of the optical pulse as already noted. Control inputs are also received by the EOM from the function generator (F.G.) and the pulse generator (P.G.). The output optical pulse from the EOM first passes through a polarization scrambler, and then is sent to the testing fiber via an optical circulator.

The Brillouin signal goes through the optical circulator, and then is converted to an electrical signal by a photodetector. The converted electrical signal is collected by a DAS (Data Acquisition System) and fed into a system control computer through an Ethernet port. The control computer also receives a signal from the ESA via the GPIB and controls the variable delay line 24 via the RS232.

The system has many advantages over the prior art, including the utilization of DFB lasers to replace a frequency stabilized and tunable laser system, which significantly reduces the cost the sensor system. Another benefit results from the use of inexpensive optical components presently available on the market that have been developed for telecom applications.

The invention claimed is:

1. A distributed Brillouin sensor system having optical fiber connections comprising:
    two distributed feedback (DFB) lasers;
    means for combining the outputs of the lasers and splitting the combination into first and second signal components;
    a first photodiode and a second photodiode arranged to receive as an input the first signal component and the second signal component respectively;
    a delay line inserted in a path of the first signal component before the first photodiode;
    a mixer for combining the output signals of the two photodiodes;
    a proportional integral derivative (PID) controller means following the mixer; and
    a current controller following the PID controller.

2. The sensor system of claim 1 wherein the mixer output is a DC signal that depends periodically on a phase difference between the first and second signal components according to the equation $Cos((\omega_1-\omega_2)\Delta t)$, wherein $\omega 1$ is the frequency of the output of the first laser, $\omega 2$ is the frequency of the output of the second laser and $\Delta t$ is the length of the delay line.

3. The sensor system of claim 1 wherein a frequency difference between the first and second signal components is a beat frequency.

4. The sensor system of claim 3 wherein the PID controller ensures that the beat frequency of the two DFB lasers is locked at a Brillouin frequency of the optical fiber connections.

5. The sensor system of claim 4 further comprising detector means for obtaining Brillouin scattering measurements in the optical fiber connections.

6. The sensor system of claim 4 wherein the optical fiber connections are PM fibers which reduce the polarization change induced power fluctuation.

7. The sensor system of claim 5 wherein the measurements are temperature or strain measurements.

8. The sensor system of claim 1 wherein a phase difference between the first and second signal component depends on the delay line which produces a time delay difference between the first and second signal components.

9. The sensor system of claim 1 wherein the PID controller means is tuned in order to keep the mixer DC output at zero level.

10. The sensor system of claim 1 wherein the current controller is used to stabilize the temperature of one of the lasers.

11. The sensor system of claim 1 wherein the delay line enables the two lasers to be tuned and locked at a Brillouin frequency of the optical fiber connections.

12. The sensor system of claim 1 wherein tuning of the delay line allows one of the two DFB lasers to be tuned across the Brillouin spectrum.

13. The sensor system of claim 1 wherein the lasers are in the 1550 nm wavelength range.

14. A distributed Brillouin sensor system having optical fiber connections comprising:
    two distributed feedback (DFB) lasers, each generating an output;
    an electro-optic modulator (EOM) for modulating the outputs of said lasers;
    means for combining the outputs of the lasers and splitting the combination into first and second signal components;
    a first photodiode and a second photodiode arranged to receive as an input the first signal component and the second signal component respectively;
    a mixer for combining the output signals of the two photodiodes;
    a proportional integral derivative (PID) controller means following the mixer;
    a current controller following the PID controller; and
    lock-in amplifier means to compensate for a bias drift of the EOM.

15. The sensor system of claim 14 wherein the lock-in amplifier means ensures a minimum DC level for pulse generation.

16. The sensor system of claim 14 wherein locking the bias drift with the lock-in amplifier means produces a stable power output.

17. The sensor system of claim 16 wherein the lock-in amplifier means produces a high extinction ratio, which produces a high strain and temperature measurement accuracy.

18. The sensor system of claim 14 wherein one of the DFB lasers is a pump laser and one of the DFB lasers is a probe laser.

* * * * *

UNITED STATES PATENT AND TRADEMARK OFFICE
CERTIFICATE OF CORRECTION

PATENT NO.      : 7,499,151 B2                                   Page 1 of 1
APPLICATION NO. : 11/806986
DATED           : March 3, 2009
INVENTOR(S)     : Xiaoyi Bao et al.

It is certified that error appears in the above-identified patent and that said Letters Patent is hereby corrected as shown below:

On the Title page of the patent, The Assignee (item (73)) should read "1) University of Ottawa, Ottawa (CA); 2) Oz Optics Ltd., Nepean (CA)."

Signed and Sealed this
Twenty-eighth Day of December, 2010

David J. Kappos
*Director of the United States Patent and Trademark Office*